(12) United States Patent
Tsuritani et al.

(10) Patent No.: US 6,768,872 B1
(45) Date of Patent: Jul. 27, 2004

(54) OPTICAL TRANSMISSION SYSTEM, OPTICAL TRANSMISSION LINE AND OPTICAL TRANSMITTER

(75) Inventors: Takehiro Tsuritani, Kamifukuoka (JP); Keiji Tanaka, Kamifukuoka (JP); Noboru Edagawa, Kamifukuoka (JP); Masatoshi Suzuki, Kamifukuoka (JP)

(73) Assignees: KDD Corporation, Tokyo (JP); KDD Submarine Cable Systems Inc., Tokyo (JP)

( * ) Notice: Subject to any disclaimer, the term of this patent is extended or adjusted under 35 U.S.C. 154(b) by 683 days.

(21) Appl. No.: 09/670,003

(22) Filed: Sep. 25, 2000

(30) Foreign Application Priority Data

Sep. 24, 1999 (JP) .......................................... 11-270216

(51) Int. Cl.$^7$ ................................................. H04J 14/02
(52) U.S. Cl. ........................... 398/81; 398/87; 398/192
(58) Field of Search .............................. 398/81, 84, 85, 398/87, 184, 192

(56) References Cited

U.S. PATENT DOCUMENTS

| | | | |
|---|---|---|---|
| 5,218,662 A | | 6/1993 | Dugan |
| 5,343,322 A | * | 8/1994 | Pirio et al. ................... 398/148 |
| 5,361,319 A | | 11/1994 | Antos et al. |
| 5,696,614 A | | 12/1997 | Ishikawa et al. |
| 5,777,770 A | | 7/1998 | Naito |
| 5,781,673 A | | 7/1998 | Reed et al. ................... 385/24 |
| 5,877,881 A | | 3/1999 | Miyauchi et al. |

(List continued on next page.)

FOREIGN PATENT DOCUMENTS

| | | |
|---|---|---|
| EP | 0 554 714 A1 | 8/1993 |
| EP | 0 701 340 A2 | 3/1996 |
| EP | 0 701 340 A3 | 11/1996 |
| EP | 0 777 347 A2 | 6/1997 |
| EP | 0 777 347 A3 | 4/1998 |
| EP | 1 035 671 A2 | 9/2000 |
| FR | 2 761 839 A1 | 10/1998 |
| GB | 2 309 131 A | 7/1997 |
| JP | 6-11620 | 1/1994 |
| JP | 10-221562 | 8/1998 |
| JP | 2000-31902 | 1/2000 |
| JP | 2000-82995 | 3/2000 |

OTHER PUBLICATIONS

M. Murakami et al; Long–Haul 16 ×10 Gb/s WDM Transmission Experiment Using Higher Order Fiber Dispersion Management Technique; IEEE Photonics Technology Letters, No. 11, No. 7, Jul. 1999; p. 898–900.

(List continued on next page.)

Primary Examiner—Jason Chan
Assistant Examiner—Dzung Tran
(74) Attorney, Agent, or Firm—Christie, Parker & Hale, LLP

(57) ABSTRACT

An optical transmitter outputs WDM signal lights comprising signal lights with 100 wavelengths of 10 Gbit/s, onto an optical transmission fiber. In the optical transmission line, a transmission fiber and a local area dispersion compensation fiber are disposed per repeater span defined by an optical amplification repeater, the local area dispersion compensation fiber is for compensating the average chromatic dispersion in the repeater span to become 2 ps/nm/km as well as a dispersion slope to become zero, and a wide area dispersion compensation fiber for compensating the average chromatic dispersion to become –0.2 ps/nm/km as well as the dispersion slope to become zero is disposed per predetermined number of optical repeater spans. The optical transmission fiber comprises a single mode optical fiber with large core diameter having a zero dispersion wavelength at a 1.3 $\mu$m band and plus chromatic dispersion at a signal wavelength band (a 1.55 $\mu$m band). The optical amplification repeater comprises an erbium-doped optical fiber to be pumped by a 0.98 $\mu$m band pumping light.

30 Claims, 9 Drawing Sheets

U.S. PATENT DOCUMENTS

| | | | |
|---|---|---|---|
| 5,940,207 A | | 8/1999 | Weich et al. |
| 5,991,477 A | | 11/1999 | Ishikawa et al. |
| 6,021,235 A | | 2/2000 | Yamamoto et al. |
| 6,043,914 A | | 3/2000 | Cook et al. |
| 6,134,033 A | * | 10/2000 | Bergano et al. ............. 398/184 |
| 6,181,449 B1 | | 1/2001 | Taga et al. |
| 6,263,138 B1 | * | 7/2001 | Sillard et al. ............... 385/123 |
| 6,307,985 B1 | * | 10/2001 | Murakami et al. ............ 385/24 |
| 6,486,993 B1 | * | 11/2002 | Kuroshima .................. 398/81 |

OTHER PUBLICATIONS

T. Tsuritani et al; '340 Gbit/s (32 ×10.66 Gbit/s) WDM transmission over 6054km using hybrid fibre spans of large core fibre and dispersion shifted fibre with low dispersion slope'; Electronics Letters, Apr. 15, 1999, vol. 35, No. 8, 2 pages.

K. Tanaka et al; '320 Gbit/s (32 ×10.7Gbit/s) error–free transmission over 7280km using dispersion flattened fibre link with standard SMF and slope compensation DCF'; Electronics Letters; Oct. 14, 1999, vol. 35, No. 21, p. 1860–1862.

European Search Report, dated Oct. 9, 2002, for corresponding European Patent Office Application No. 00119594.0–1246.

D. Le Guen et al, Narrow Band 640 Gbit/s Soliton WDM Transmission over 1200 km of Standard Fibre with 100 km–21 dB Amplifier Spans, ECOC 1998, Sep. 20–24, 1998, pp. 61 and 63.

T. Naito et al, 1 Terabit/s WDM Transmission over 10,000 km, ECOC 1999, pp. 24–25.

T. Tanaka et al, 2.1–Tbit/s WDM Transmission Over 7,221 km with 80–km Repeater Spacing, ECOC 1000, Sep. 3–7, 2000, 4 pages.

I. Morita et al, 40 Gb/s Single–Channel Soliton Transmission Over Transoceanic Distances by Reducing Gordon––Haus Timing Jitter and Sokiton–Soliton Interaction; Journal of Lightwave Technology, vol. 17, No. 12, Dec. 1999, pp. 2606–2511.

I. Morita et al, 40 Gbit/s ×16 WDM Transmission over 2000 KM using Dispersion Managed Low–Nonlinear Fiber Span; ECOC 2000, Sep. 3–7, 2000, pp. 25–27 (total of 5 pages).

M. Suzuki et al, 20 Gbit/s–based soliton WDM transmission over transoceanic distances using periodic compensation of dispersion and its slope, Electronics Letters, Apr. 10, 1997, vol. 33, No. 8, pp. 691–692.

H. Taga et al, 213Gbit/s (20×10.66Gbit/s), over 9000km Transmission Experiment using Dispersion Slope Compensator, OFC 1998, pp. PD13–1–PD–13–4 (6 pages total).

EP Search Report, dated Jul. 5, 2001.

EP Search Rport, dated Jul. 19, 2002.

Patent Abstract of Japan, Publication No. 08237222, Published Sep. 13, 1996, in the name of Nippon Telegr & Teleph Corp.

Taga, et al., "20 WDM, 10.66 Gbit/s transmission experiment over 9000 km using periodic dispersion slope compensation," Electronics Letters, Mar. 5, 1998, vol. 34 No. 5, pp. 476–478.

Kikuchi, et al., "Analysis of cross–phase modulation (XPM) effect on WDM transmission performance," Electronics Letters, Apr. 10, 1997, vol. 33 No. 8, pp. 653–654.

Murakami, et al, "Long–Haul 16×10 WDM Transmission Experiment Using Higher Order Fiber Dispersion Management Technique", ECOC'98, Sep. 20–24, 1998, pp. 313–314, Madrid, Spain.

Matsuda, et al, "340 Gbit/s (34×10 Gbit/s) WDM transmission over 8,514 km using broadband gain equalisation technique for transoceanic systems", Electronics Letters, 1999, pp. 1090–1091, vol. 35, No. 13.

* cited by examiner

OPTICAL TRANSMISSION SYSTEM, OPTICAL TRANSMISSION LINE AND OPTICAL TRANSMITTER

FIELD OF THE INVENTION

This invention relates to an optical transmission system, an optical transmission line and an optical transmitter, and more specifically to an optical transmission system, an optical transmission line and an optical transmitter applicable for long haul and large capacity transmission.

BACKGROUND OF THE INVENTION

In recent years, there has been a big demand for data transmission and accordingly long haul and large capacity transmission lines have been desired. In order to realize the long haul and large capacity transmission, it is necessary to appropriately control nonlinear effect and chromatic dispersion as described by M. Murakami et al. in "Long-Haul 16×10 WDM Transmission Experiment Using Higher Order Fiber Dispersion Management Technique," ECOC'98, 20–24 September, Madrid, Spain and Japanese Disclosure Gazette No. 10-221562 (U.S. Pat. No. 5,781,673).

The paper of Murakami et al. discloses a configuration in which two optical fibers, having chromatic dispersion values of opposite signs and approximately equal lengths, are disposed in one repeater span, and chromatic dispersion values and dispersion slopes of the two kinds of the optical fibers are selected so that accumulated chromatic dispersions become zero at a certain target wavelength (a central wavelength 1550.7 nm of a signal wavelength band) and difference between the accumulated chromatic dispersions within the signal wavelength band is reduced. Furthermore, it describes that, in each repeater span, the optical fiber disposed in front should have a lager mode-field diameter of 9.2 $\mu$m compared to 5.7 $\mu$m of the optical fiber disposed in behind so as to reduce the non-linear effects.

Also, the Japanese Patent Disclosure Gazette No. Heisei 10-221562 discloses a configuration in which the following elements are disposed in series; a first optical fiber having non-zero chromatic dispersion within a signal wavelength band, a second optical fiber having chromatic dispersion with a mathematical sign opposite to that of the first optical fiber, and a third fiber for compensating dispersion slope in the signal wavelength band. It is also described in the Gazette that the second optical fiber makes the total chromatic dispersion of the whole transmission line to be zero with a certain wavelength in the signal wavelength band, and the third fiber makes the dispersion slope to be $-0.1$ ps/nm$^2$/km.

Concretely, experimental results of 34 wavelengths×10 Gbit/s WDM transoceanic optical transmission systems such as explained below have been reported (e.g. K. Matsuda et al. "340 Gbit/s (34×10 Gbit/s) WDM transmission over 8,514 km using broadband gain equalization technique for transoceanic systems," Electronics Letter, Vol. 35, pp. 1090–1091, 1999).

If such dispersion control described in the above paper is used, it is practically impossible to realize a terabit class WDM optical transmission system that enables long haul transoceanic optical transmission over 7000 km by multiplexing 100 wavelengths of 10 Gbit/s or so. It is therefore necessary to develop more advanced systems.

SUMMARY OF THE INVENTION

An object of the present invention is to provide an optical transmission system, an optical transmission line and an optical transmitter for realizing even larger capacity and longer haul transmission.

An optical transmission system according to the invention comprises an optical transmitter for outputting WDM signal light, an optical transmission line having a plurality of first optical amplification repeater spans and transmitting the WDM signal light output from the optical transmitter, and an optical receiver for receiving the WDM signal light propagated on the optical transmission line, wherein the first optical amplification repeater span of the optical transmission line comprises a first optical repeater amplifier for optically amplifying the WDM signal light, an optical transmission fiber of plus chromatic dispersion for transmitting the WDM signal light output from the optical repeater amplifier, and a local area dispersion compensator of minus chromatic dispersion for compensating accumulated chromatic dispersion caused by the optical transmission fiber so that average chromatic dispersion in the span becomes a predetermined value $D_{local}$ as well as compensating a dispersion slope to become practically zero, wherein $D_{local}$ is no less than 1 ps/nm/km and no more than 4 ps/nm/km.

An optical transmission line according to the invention comprises a plurality of optical amplification repeater spans and transmits WDM signal light, wherein each optical amplification repeater span comprises a first optical repeater amplifier for optically amplifying the WDM signal light, an optical transmission fiber of positive chromatic dispersion for transmitting the WDM signal light output from the optical repeater amplifier, and a local area dispersion compensator of minus chromatic dispersion for compensating accumulated chromatic dispersion caused by the optical transmission fiber so that the average chromatic dispersion in the span becomes a predetermined value $D_{local}$ as well as compensating a dispersion slope to become practically zero, wherein $D_{local}$ is no less than 1 ps/nm/km and no more than 4 ps/nm/km.

With this configuration, an optical transmission line with a little nonlinear effect and flat chromatic dispersion characteristics can be obtained, and it also becomes possible to narrow signal wavelength intervals. Consequently, dense wavelength multiplexing can be realized, and accordingly the long haul and high capacity transmission can be realized in combination with appropriate control of the chromatic dispersion.

Preferably, the optical transmission system further comprises a second optical amplification repeater span disposed at every wide area dispersion compensation cycle composed of a plurality of the first optical amplification repeater spans, the second optical amplification repeater span comprises a second optical repeater amplifier for optically amplifying the WDM signal light and having gain smaller than that of the first optical repeater amplifier, and a wide area dispersion compensator for compensating the dispersion slope to become practically zero as well as compensating the accumulated chromatic dispersion of the WDM signal light so that average chromatic dispersion in the wide area dispersion compensation cycle becomes a predetermined value $D_{avg}$. With this configuration, the frequency that the accumulated chromatic dispersion passes across the zero point is reduced and therefore the accumulated chromatic dispersion of the whole optical transmission line can be controlled to keep a low value.

Preferably, the optical transmission line according to the invention further comprises a second optical repeater amplifier for optically amplifying the WDM signal lights output after propagating the plurality of the optical amplification repeater spans, the second optical repeater amplifier having gain smaller than that of the first optical repeater amplifier, and a wide area dispersion compensator for compensating accumulated chromatic dispersion of the WDM signal lights output from the second optical repeater amplifier so that the average chromatic dispersion becomes a minus predetermined value $D_{avg}$ as well as compensating a dispersion slope to become practically zero. With this configuration, the frequency that the accumulated chromatic dispersion passes across the zero point is reduced and therefore the accumulated chromatic dispersion of the whole optical transmission line can be controlled to keep a low value.

Preferably, in both inventions, the second optical repeater amplifier comprises an optical amplifier having the same gain with the first repeater amplifier and an attenuator for attenuating output light from the optical amplifier to become a predetermined level. With this configuration, it becomes possible to equalize loss of every repeater span and hence the optical repeater amplifiers with the same gain characteristics can be used, making gain profile control and maintenance control to be simplified.

Preferably, $D_{ave}$ should be set practically from $-0.3$ to $-0.1$ ps/nm/km. This reduces the frequency that the accumulated chromatic dispersion passes across the zero point and hence spectrum spreading can be decreased. Accordingly, high capacity and long haul transmission such as 1 Tbit/s transmission of 8000 km can be realized.

Preferably, an effective core area should be set to $110\,\mu m^2$ or more. This drastically reduces the nonlinear effect.

Preferably, a mode field conversion optical system should be disposed between the optical transmission fiber and the local area dispersion compensator. With this configuration, the optical transmission fiber and the local area dispersion compensator having largely different mode field diameters can be optically connected with low loss.

In the optical transmission system according to the invention, the optical transmitter preferably comprises a plurality of signal light generators for outputting signal lights respectively having a wavelength different from each other and a polarization combiner for combining the signal lights output from the signal light generators so that polarizations of adjacent wavelength channels become orthogonal. Since the polarization directions of the adjacent channels are different directions, channel-to-channel interaction such as XPM (Cross Phase Modulation) can be reduced even when the intervals of the signal wavelengths are narrowed.

In the optical transmission system according to the invention, the optical transmitter preferably comprises a plurality of signal light generators for outputting signal lights respectively having a wavelength different from each other, a first wavelength multiplexing element for wavelength-multiplexing the signal lights with even-numbered wavelengths output from the signal light generators in the same polarization, a second wavelength multiplexing element for wavelength-multiplexing the signal lights with odd-numbered wavelengths output from the signal light generators in the same polarization, and a polarization combiner for combining output lights from the first and second wavelength multiplexing elements in mutually orthogonal polarizations from each other. With this configuration, the adjacent wavelength channels can be combined in the different directions of polarization using only a few polarization-combining elements.

In the optical transmission system according to the invention, the optical transmitter preferably comprises a plurality of signal light generators for outputting signal lights respectively having a wavelength different from each other, the plurality of signal light generators being divided into a plurality of groups in order of wavelength, a plurality of wavelength multiplexers for wavelength-multiplexing the signal lights output from the respective groups of the signal light generators, a plurality of optical filters for removing unnecessary band components from the respective output lights of the plurality of the wavelength multiplexers, a combiner for combining output lights from the plurality of the optical filters, and a plurality of chromatic dispersion imparters for imparting predetermined amounts of chromatic dispersion to the signal lights of the respective groups. With this configuration, S/N ratio of the signal light being output onto the optical transmission line can be improved and as a result the transmission distance can be extended.

In the optical transmission system according to the invention, the optical transmitter preferably comprises a plurality of signal light generators for outputting signal lights respectively having a wavelength different from each other, the signal light generators being divided into first and second groups, a first wavelength multiplexing element for wavelength-multiplexing the signal lights with even-numbered wavelengths output from the first group of the signal light generators in the same polarization, a second wavelength multiplexing element for wavelength-multiplexing the signal light with odd-numbered wavelengths output from the first group of the signal light generators in the same polarization, a first polarization combiner for combining the output lights from the first and second wavelength multiplexing elements in mutually orthogonal polarizations, a first optical filter for removing unnecessary band components from output light of the first polarization combiner, a third wavelength multiplexing element for wavelength-multiplexing the signal lights with the even-numbered wavelengths output from the second group of the signal light generators in the same polarization, a fourth wavelength multiplexing element for wavelength-multiplexing the signal lights with the odd-numbered wavelengths output from the second group of the signal light generators in the same polarization, a second polarization combiner for combining output lights from the third and fourth wavelength multiplexing elements in mutually orthogonal polarizations, a second optical filter for removing unnecessary band components from output light of the second polarization combiner, a combiner for combining the output lights from the first and second optical filters, and first and second chromatic dispersion imparters for imparting predetermined amounts of chromatic dispersion to the signal lights in the first and second groups respectively. With this configuration, when extremely many signal lights such as 100 wavelengths are wavelength-multiplexed, it can be performed efficiently since adjacent wavelength channels have different polarization directions.

In the optical transmission system according to the invention, preferably, the first chromatic dispersion imparter is connected to an output of the combiner, and the second chromatic dispersion imparter is disposed between the second polarization combiner and the combiner. With this configuration, the first chromatic dispersion imparter imparts a predetermined chromatic dispersion to all signal lights and the second chromatic dispersion imparter imparts a necessary chromatic dispersion to the signal lights in the second group. The total length of the chromatic dispersion imparter can be shortened compared to the case that chromatic dispersion is individually imparted to the respective groups.

The optical transmitter according to the invention comprises a plurality of signal light generators for outputting signal lights respectively having a wavelength different from each other, the plurality of signal light generators being divided into a plurality of groups in order of wavelength, a plurality of wavelength multiplexers for wavelength-multiplexing the signal lights output from respective groups of the signal light generators, a plurality of optical filters for removing unnecessary band components from the respective output lights of the plurality of the wavelength multiplexers, a combiner for combining output lights from the plurality of the optical filters, and a plurality of chromatic dispersion imparters for imparting predetermined amounts of chromatic dispersion to the signal lights of respective the groups. With this configuration, S/N ratio of the signal light being output onto the optical transmission line can be improved and as a result the transmission distance can be extended.

The optical transmitter according to the invention comprises a plurality of signal light generators for outputting signal lights respectively having a wavelength different from each other, the plurality of signal light generators being divided into first and second groups, a first wavelength multiplexing element for wavelength-multiplexing the signal lights with even-numbered wavelengths output from the first group of the signal light generators in the same polarization, a second wavelength multiplexing element for wavelength-multiplexing the signal lights with odd-numbered wavelengths output from the first group of the signal light generators in the same polarization, a first polarization combiner for combining the output lights of the first and second wavelength multiplexing elements in mutually orthogonal polarizations, a first optical filter for removing unnecessary band components from output light of the first polarization combiner, a third wavelength multiplexing element for wavelength-multiplexing either signal lights with the even-numbered wavelengths output from the second group of the signal light generators in the same polarization, a fourth wavelength multiplexing element for wavelength-multiplexing the other signal lights with the odd-numbered wavelengths output from the second group of the signal light generators in the same polarization, a second polarization combiner for combining the output lights of the third and fourth wavelength multiplexing elements in mutually orthogonal polarizations, a second optical filter for removing unnecessary band components from output light of the second polarization combiner, a combiner for combining the output lights from the first and second optical filters, and first and second chromatic dispersion imparters for imparting predetermined amounts of chromatic dispersion to the signal lights in the first and second groups respectively.

With this configuration, when extremely many signal lights such as 100 wavelengths are wavelength-multiplexed, it can be performed efficiently since adjacent wavelength channels have different polarization directions.

Preferably, the first chromatic dispersion imparter is connected to an output of the combiner, and the second chromatic dispersion imparter is disposed between the second polarization combiner and the combiner. With this configuration, the first chromatic dispersion imparter imparts a predetermined chromatic dispersion to all signal lights and the second chromatic dispersion imparter imparts a necessary chromatic dispersion to the signal lights in the second group. The total length of the chromatic dispersion imparter can be shortened compared to the case that chromatic dispersion is individually imparted to the respective groups.

The optical transmission system according to the invention comprises an optical transmitter for outputting signal light, an optical transmission line for transmitting the signal light output from the optical transmitter, and an optical receiver for receiving the signal light transmitted on the optical transmission line, wherein the optical transmission line comprises a plurality of optical transmission fibers for transmitting the signal light, a plurality of optical repeater amplifiers for optically amplifying the signal light, one or more wide area dispersion compensators, disposed every wide area dispersion compensation cycle having a plurality of optical repeater spans determined by the optical repeater amplifiers, for compensating the chromatic dispersion of the signal light so that the average chromatic dispersion value of the whole transmission line becomes a value equal to a minus predetermined value $D_{avg}$, wherein $D_{avg}$ is no less than $-0.3$ ps/nm/km and no more than $-0.1$ ps/nm/km, and a plurality of local area dispersion compensators, each disposed after the optical transmission fiber in each predetermined optical repeater span within the wide area dispersion compensation cycle, for compensating chromatic dispersion of the signal light output from the optical transmission fiber so that the average chromatic dispersion value in each optical repeater span becomes a predetermined value $D_{local}$, wherein $D_{local}$ is no less than 1 ps/nm/km and no more than 4 ps/nm/km.

Also, the optical transmission line according to the invention comprises a plurality of optical transmission fibers for transmitting signal light, a plurality of optical repeater amplifiers for optically amplifying the signal light, one or more wide area dispersion compensators, disposed every wide area dispersion compensation cycle having a plurality of optical repeater spans determined by the optical repeater amplifiers, for compensating chromatic dispersion of the signal light so that the average chromatic dispersion of the whole transmission line becomes to a value equal to a minus predetermined value $D_{avg}$, wherein $D_{avg}$ is no less than $-0.3$ ps/nm/km and no more than $-0.1$ ps/nm/km, and a plurality of local area dispersion compensators, each disposed after the optical transmission fiber in a predetermined optical repeater span within the wide area dispersion compensation cycle, for compensating chromatic dispersion of the signal light output from the optical transmission fiber so that the average chromatic dispersion in each optical repeater span becomes a predetermined value $D_{local}$, wherein $D_{local}$ is no less than 1 ps/nm/km and no more than 4 ps/nm/km.

With these configurations, the nonlinear effect and the chromatic dispersion can be highly balanced and hence the long haul transmission characteristics are improved. Since the frequency that the accumulated chromatic dispersion passes across the zero point is reduced, deterioration of signal spectrum can be reduced. This also leads to the improvement of the transmission characteristics.

Preferably, in the optical repeater span in which the wide area dispersion compensator is disposed, an attenuator is disposed in front of the wide area dispersion compensator, the attenuator has a predetermined loss amount for adjusting loss in the optical repeater span to become a predetermined value. With this configuration, it becomes possible to equalize losses of all repeater spans and hereby the optical repeater amplifiers with the same gain characteristics can be used making file control and maintenance control easier.

Preferably, the wide area dispersion compensator compensates a dispersion slope of the signal light to become practically zero, and the local area dispersion compensator compensates the dispersion slope of the signal light to become practically zero. With this configuration, an optical transmission line with a little nonlinear effect and flat chromatic dispersion characteristics can be realized, and also signal wavelength intervals can be narrowed. Consequently, dense wavelength multiplexing is realized, and thus long haul and large capacity transmission can be realized combined with proper control of the chromatic dispersion.

An effective core area of the optical transmission line is preferably no less than 110 $\mu m^2$. With this value, the nonlinear effect can be greatly reduced.

Preferably, a mode field conversion optical system is disposed between the optical transmission fiber and the local area dispersion compensator. With this configuration, the optical transmission fiber and the local area dispersion compensator, both having quite different mode field diameters, can be connected at low loss.

BRIEF DESCRIPTION OF THE DRAWING

The above and other objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
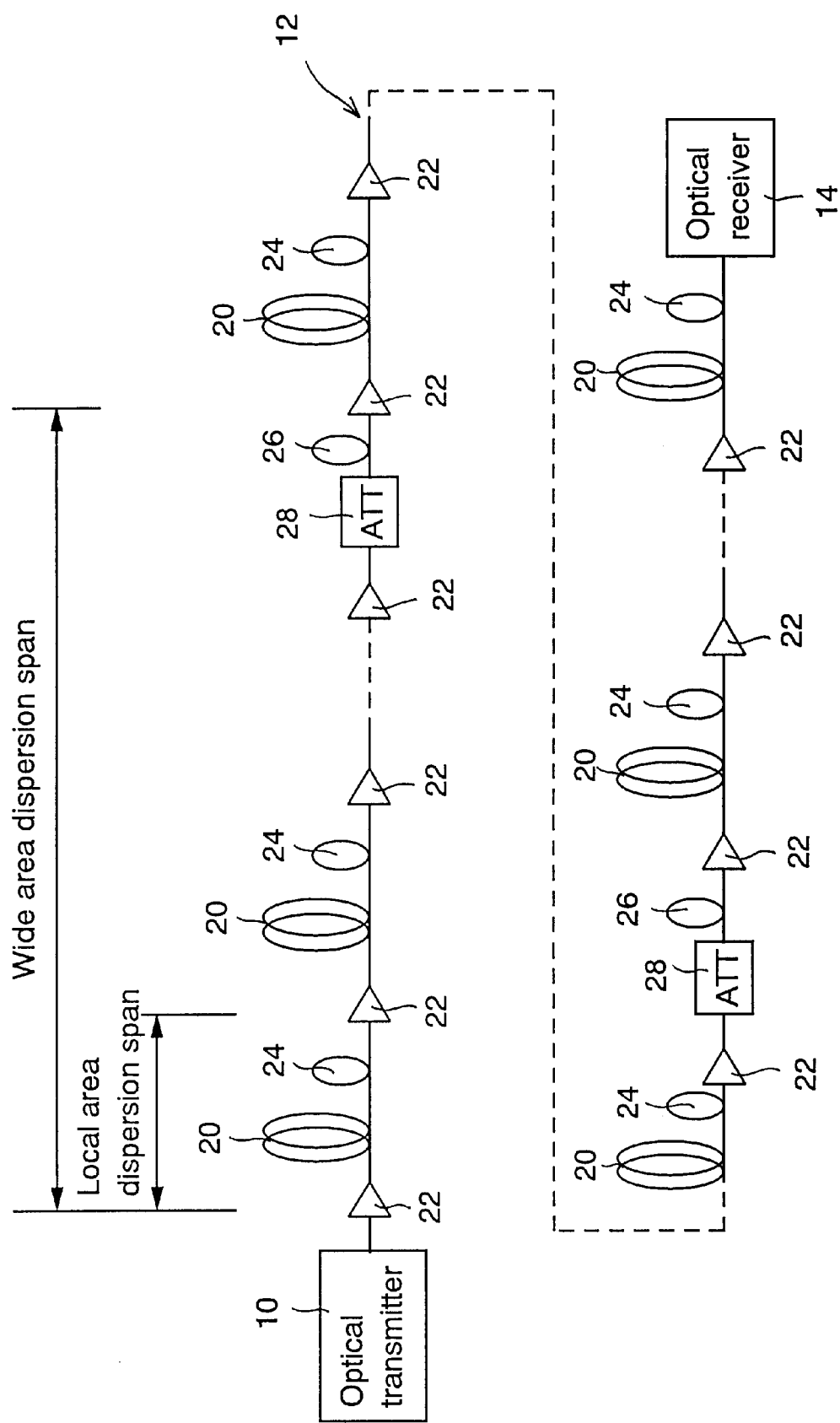
FIG. 1 shows a schematic block diagram of a first embodiment according to the invention.

FIG. 1 shows a schematic block diagram of an embodiment according to the invention. Reference numeral 10 denotes an optical transmitter for outputting WDM signal light, 12 denotes an optical transmission line, and 14 denotes an optical receiver. Although the details are described later, the optical transmitter 10 outputs the WDM signal light with 1 Tbit/s consisted of 100 wavelengths of 10 Gbit/s.

The optical transmission line 12 comprises an optical amplification repeating transmission line for compensating chromatic dispersion and dispersion slope, and reference numeral 20 denotes optical transmission fiber, 22 denotes an optical amplification repeater, 24 denotes a local area dispersion compensation fiber for locally compensating the dispersion slope and accumulated chromatic dispersion, 26 denotes a wide area dispersion compensation fiber for widely compensating the dispersion slope and accumulated chromatic dispersion, and 28 denotes an attenuator for adjusting the loss in the repeating span in which the wide area dispersion compensation fiber 26 is disposed to the same loss value with the other repeating spans.

Although the details are described later, in this embodiment, the local area dispersion compensation fiber 24 compensates the accumulated chromatic dispersion and dispersion slope with the optical transmission fiber 20 so that the average chromatic dispersion value at each repeater span becomes approximately +2 ps/nm/km. After this local area dispersion compensation is repeated n times, the wide area dispersion compensation fiber 26 compensates the chromatic dispersion and dispersion slope of the WDM signal light so that the average chromatic dispersion value of the whole system becomes −0.2 ps/nm/km. In this specification, the former is referred to as local area dispersion compensation, and the latter is referred to as wide area dispersion compensation. That is, in this embodiment, there are two kinds of the dispersion compensations; one (the wide area dispersion compensation) is to compensate the dispersion slope and chromatic dispersion in each cycle of (n+1) repeater spans (a wide area dispersion compensation span), and the other (the local area dispersion compensation) is to compensate the dispersion slope and chromatic dispersion in each cycle of one repeater span (a local area dispersion compensation span).

The optical amplification repeater 22 comprises an erbium-doped optical fiber to be pumped by 0.98 $\mu m$ band pumping light. With this configuration, the generation of noise at the optical amplification can be reduced.

By disposing the attenuator 28 directly in front of the wide area dispersion compensation fiber 26, it becomes possible to equalize losses in the respective repeater spans. This enables to employ the optical amplification repeaters 22 having the same characteristics, and hereby gain profile control and maintenance control become much easier.

FIGS. 2(a) and 2(b) respectively show a detailed diagram and a dispersion map in a wide area dispersion compensation span of an optical transmission line 12.

The local area dispersion compensation fiber 24 and the wide area dispersion compensation fiber 26 respectively comprise a slope compensating dispersion compensation fiber.

In the embodiment, in order to realize 100 wavelengths WDM transmission, a single mode optical fiber with large effective core area is employed having a zero dispersion wavelength at a 1.3 $\mu m$ band and a plus chromatic dispersion at a signal wavelength band (a 1.55 $\mu m$ band); for instance, its effective core area is no less than 110 $\mu m^2$, its chromatic dispersion is approximately 20 ps/nm/km at 1550 nm, its dispersion slope is 0.06 ps/nm$^2$/km, and its distance is 40 km. By employing an optical fiber with such large effective core area, the nonlinear effect can be reduced.

When the local area dispersion compensation fiber 24 comprises a SCDCF, for instance, its effective core area is 19 $\mu m^2$, its chromatic dispersion is −640 ps/nm/km at 1550 nm, its dispersion slope is −0.3 ps/nm$^2$/km, and its distance is 7 km. With regard to the dispersion compensation fibers, it is generally difficult to greatly enlarge the effective core area and therefore the nonlinear effect becomes larger. From the point of view of the nonlinear effect, the shorter dispersion compensation fibers are desirable. Needless to say, the chromatic dispersion value and dispersion slope of the local area dispersion compensation fiber 24 vary according to the length ratio of the optical transmission fiber 20 to the local area dispersion compensation fiber 24 and the average chromatic dispersion $D_{local}$ in a repeater span.

The wide area dispersion compensation fiber 26 compensates the chromatic dispersion accumulated in the wide area compensation span so that the average chromatic dispersion value in the wide area compensation span becomes −0.2 ps/nm/km and also the dispersion slope becomes practically zero. The dispersion management that the wide area dispersion compensation controls the average chromatic dispersion in the wide area to be minus reduces the frequency that the accumulated chromatic dispersion passes through the zero point. When the accumulated chromatic dispersion becomes zero or around zero, spectrum spreading occurs consequently making the high-density WDM transmission impossible. As shown in this embodiment, such high-density WDM transmission with its wavelength interval from 0.2 to 0.3 nm can be realized by keeping the chromatic dispersion locally plus value and widely minus value.

Figure 2:
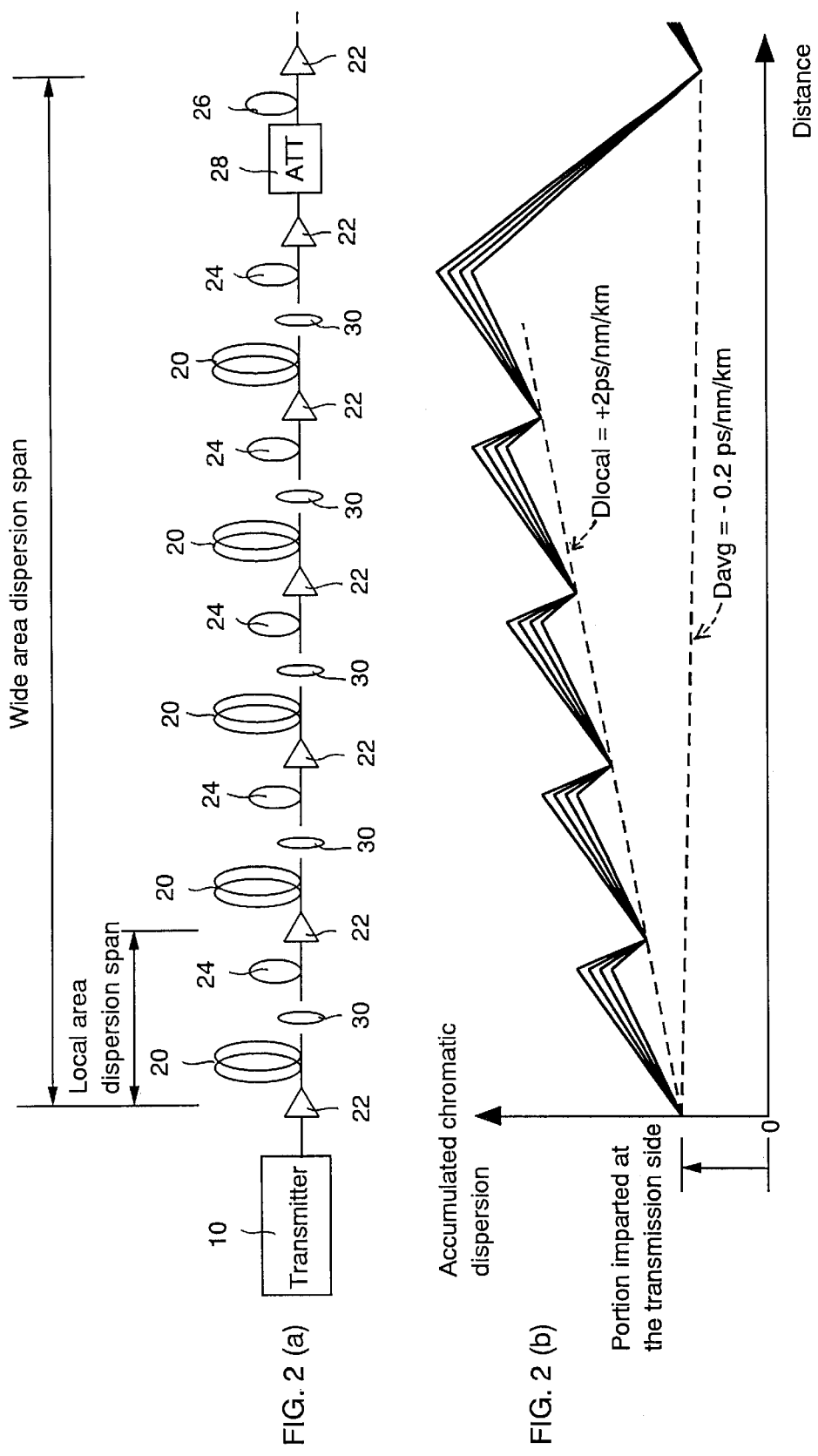
FIG. 2(a) illustrates a schematic configuration of an optical transmission line 12 according to the embodiment.
FIG. 2(b) shows a dispersion map of the optical transmission line 12.

Generally, fusion is used in order to connect the optical fibers. However, the effective core area of the optical transmission fiber 20 and that of the local area dispersion compensation fiber 24 are greatly different and thus it is difficult to connect them using the fusion. Accordingly, in this embodiment, a mode diameter conversion lens 30 is disposed between the optical transmission fiber 20 and the local area dispersion compensation fiber 24. With this configuration, the optical transmission fiber 20 and the local area dispersion compensation fiber 24 can be optically efficiently connected. In FIG. 2, although the lens 30 is illustrated to comprise a single lens, it can also comprise several lenses.

Figure 3:
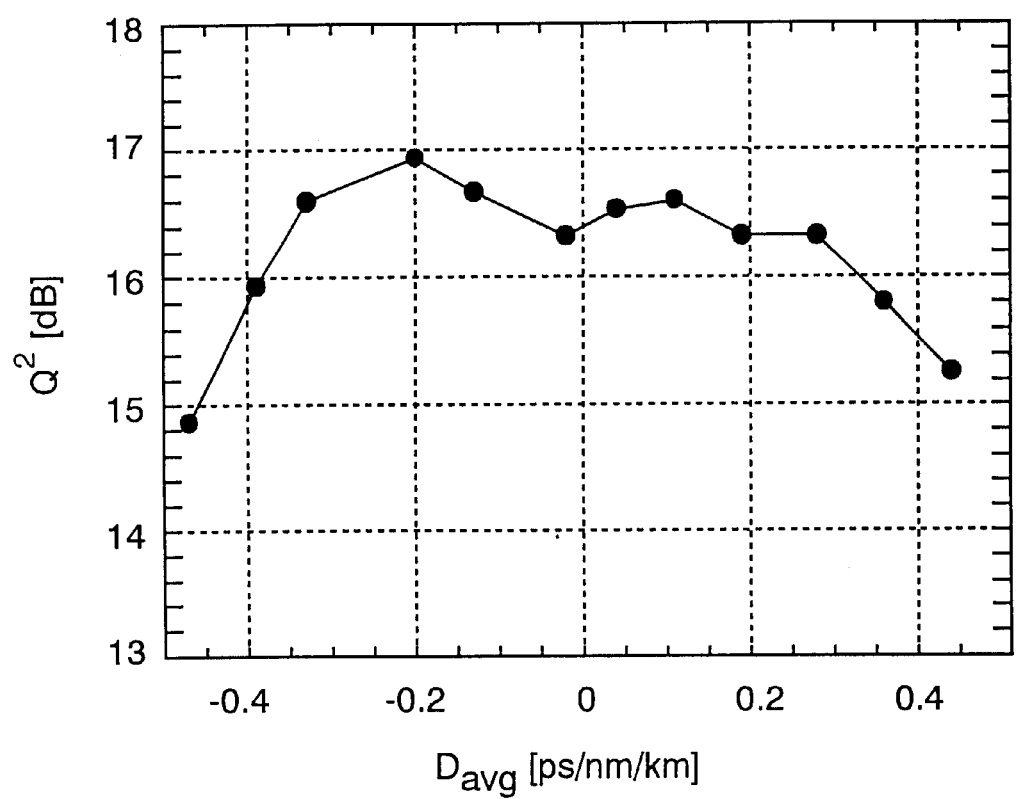
FIG. 3 illustrates a measured result of an optimum value $D_{avg}$ for wideband dispersion compensation.

In a dispersion compensating system like this embodiment to employ both local area and wide area dispersion compensations, a desirable average chromatic dispersion value $D_{avg}$ is examined. The result is shown in FIG. 3. The vertical axis and the horizontal axis express $Q^2$ value and $D_{avg}$ respectively. It is clear from the result that $D_{avg}$ preferably should be minus rather than plus, especially around −0.2 ps/nm/km is most preferable.

As for the average chromatic dispersion $D_{local}$ in the repeater span, when its absolute value becomes less than 1 ps/nm/km, it approaches zero too closely causing spectrum spreading and hereby the transmission characteristics deteriorate due to interchannel crosstalk. When $D_{local}$ becomes minus, the accumulated chromatic dispersion passes the zero in before and behind of each optical amplification repeater and consequently the spectrum spreads too much. Accordingly, $D_{local}$ should preferably be no less than 1 ps/nm/km. On the other hand, when $D_{local}$ becomes too large, the burden for the wide area dispersion compensation becomes heavier. In 10 Gb/s base WDM optical transmission, for instance, permissive accumulated chromatic dispersion is around 1000 ps/nm. Assuming that the wide area dispersion compensation fiber 26 compensates accumulated chromatic dispersion of six repeater spans when each repeater span is 45 km and $D_{local}$ is 5 ps/nm/km, the dispersion compensation amount of the wide area dispersion compensation fiber becomes 1350 ps/nm which is too much.

When the disposition intervals of the wide area dispersion fiber 26 are narrowed, the frequency that the accumulated chromatic dispersion passes the zero point increases. As a result, the spectrum of the signal wavelength is spread, and the transmission characteristics are deteriorated due to interchannel crosstalk. Furthermore, since power of incident light of the wide area dispersion compensation fiber 26 increases, the deterioration of the transmission characteristics becomes more due to the linear effect in the wide area dispersion compensation fiber 26. It shows that it is not preferable to increase $D_{local}$.

In consequence from the above consideration, as to the dispersion compensation, the average chromatic dispersion $D_{local}$ in one local area compensation span should be preferably +1~4 ps/nm/km, and the average chromatic dispersion $D_{avg}$ of the whole transmission line should be preferably around −0.2 ps/nm/km.

Figure 4:
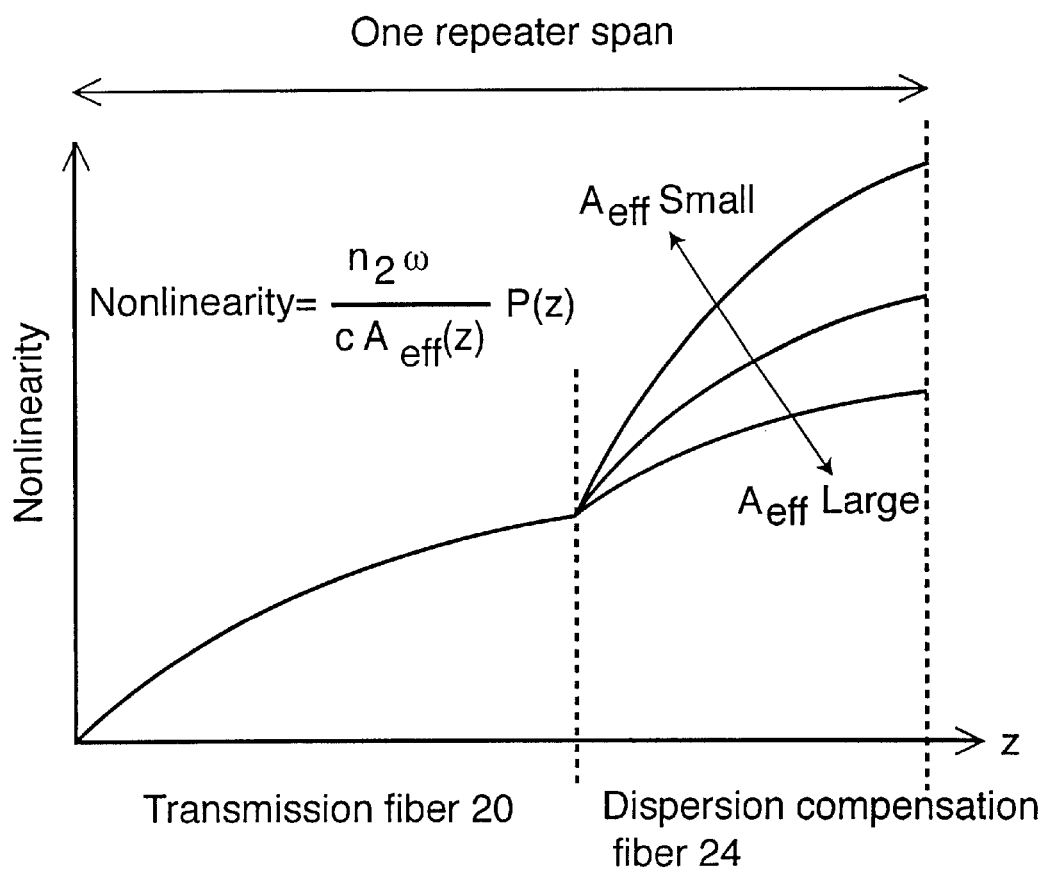
FIG. 4 illustrates a schematic diagram showing variation of nonlinear effect relative to distance.

The nonlinearity can be for instance evaluated by the following expression. That is:

$$\text{Nonlinearity} = n_2 \times \omega \times P(z)/(c \times A_{\text{eff}}(z))$$

where $n_2$, $\omega$, $P(z)$, $c$, $A_{\text{eff}}(z)$, and $z$ represent a nonlinear constant, an angular frequency, optical power, an optical speed, an effective core area, and distance respectively. FIG. 4 illustrates a schematic diagram showing accumulated values of the nonlinear effect relative to distance. The vertical axis represents the accumulated values of the nonlinearity relative to the distance which is evaluated by the above expression and the horizontal axis represents the distance respectively. Since the slope compensating dispersion compensation fiber which is used as the local area dispersion compensation fiber 24 generally has smaller effective core area compared to the transmission fiber 20, the nonlinear effect increases at the dispersion compensation fiber 24. Accordingly, by making the transmission fiber 20 relatively longer (i.e. by making the local area dispersion compensation fiber 24 relatively shorter) in one repeater span, the whole nonlinear effect can be reduced.

On the other hand, the chromatic dispersion $D_b$ of the local area dispersion compensation fiber 24 necessary to keep the average chromatic dispersion $D_{local}$ in the one local area compensation span can be evaluated by the following expressions. That is:

$$D_b = D_a - (D_a - D_{local})L/z$$

where $D_a$, L, and z represent the chromatic dispersion of the transmission fiber 20, distance of the local area compensation span and length of the local area dispersion compensation fiber 24 respectively. Since $D_a$ is plus, $D_b$ becomes minus.

Figure 5:
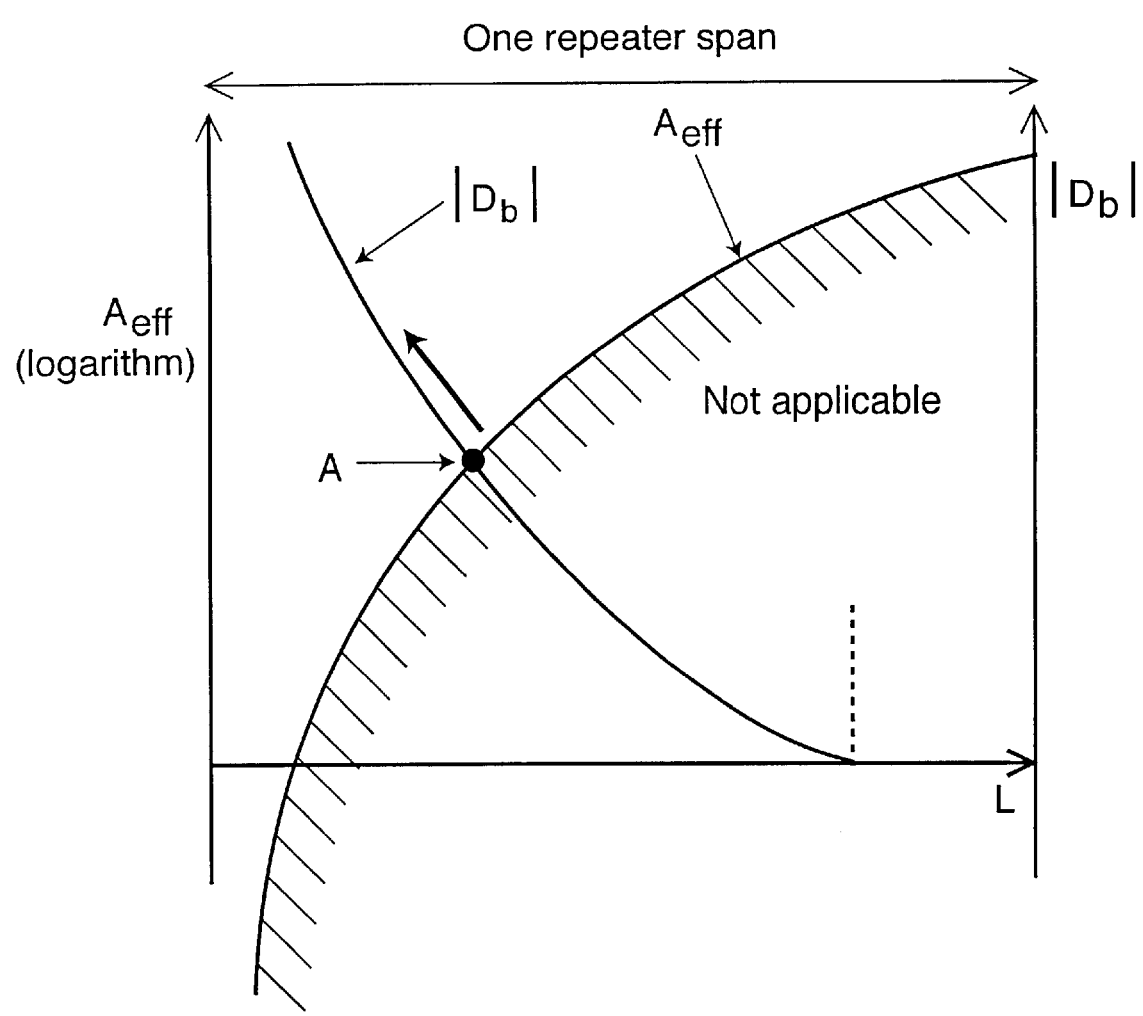
FIG. 5 illustrates a schematic diagram showing variation of a effective core area $A_{eff}$ and a chromatic dispersion value $|D_b|$ of a local area dispersion compensation fiber 24 relative to length L.

FIG. 5 shows the effective core area $A_{\text{eff}}$ that the local area dispersion compensation fiber 24 can afford to take and the chromatic dispersion value to satisfy its necessary dispersion compensation amount in one local area dispersion compensation span. The horizontal axis represents length L of the local area dispersion compensation fiber 24, and the vertical axis represents the effective core area $A_{\text{eff}}$ and the chromatic dispersion value $|D_b|$. A characteristic curve 32 represents the minimum effective core area of the local area dispersion compensation fiber 24 to be able to fulfil the aimed nonlinear effect in one local area dispersion compensation span. When the local area dispersion compensation fiber 24 has the effective core area $A_{\text{eff}}$ wider than the characteristic curve 32, the nonlinear effect in one location area dispersion compensation span can be reduced even more. A characteristic curve 34 represents the chromatic dispersion value $|D_b|$ of the local area dispersion compensation fiber 24. Accordingly, the local area dispersion compensation fiber 24 which effective core area $A_{\text{eff}}$ and the chromatic dispersion value $|D_b|$ should be located at the upper left from the intersection point A of the characteristic curves 32 and 34 is appropriate. The lower the nonlinear effect in one local area dispersion compensation span is set, the higher the characteristic curve 32 goes up, and thus the local area dispersion compensation fiber 24 has to be that much thickened or shortened.

Realistically, the minimum length of the local area dispersion compensation fiber 24 is limited by the realizable effective core area and dispersion compensation value (the absolute value). It is preferable that in the left part from the intersection point A in FIG. 5, the dispersion compensation value (the absolute value) is larger than that at the intersection point A, and the effective core area is also larger than that at the intersection point A.

Figure 6:
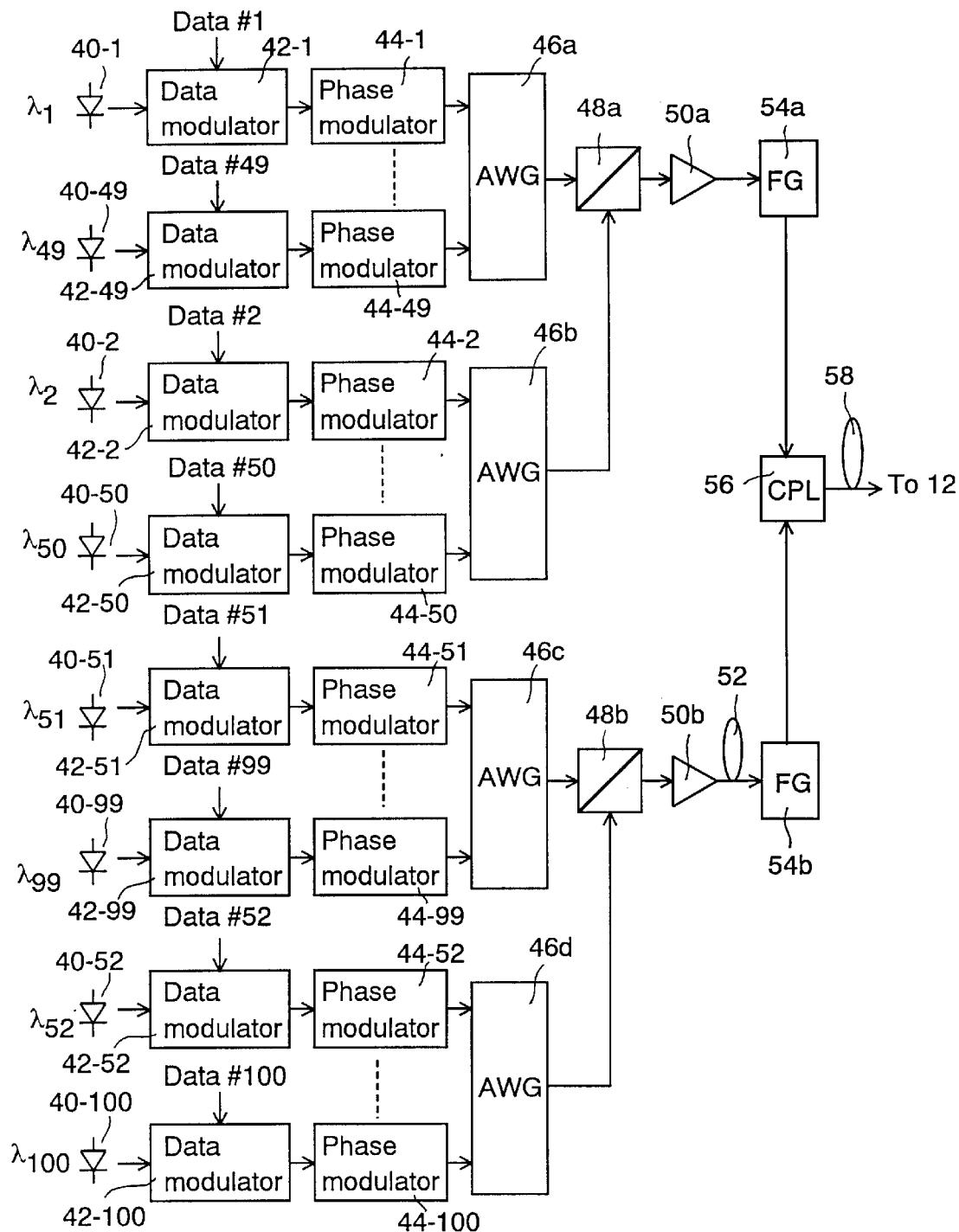
FIG. 6 shows a schematic block diagram of an optical transmitter 10.

FIG. 6 shows a schematic block diagram of an optical transmitter 10. In order to put 100 wavelengths in a signal wavelength band 20 nm through 30 nm, their wavelength intervals have to be as narrow as 0.2 nm through 0.3 nm. In such case, interference between adjacent channels becomes a problem, and accordingly, in this embodiment, the adjacent channels (the adjacent wavelengths) are transmitted by mutually orthogonal polarizations.

Reference numerals 40-1~40-100 denote laser diodes to continuously laser-oscillate at wavelengths $\lambda_1$~$\lambda_{100}$ respectively. Each of data modulators 42-1~42-100 modulates respective output light from the laser diodes 40-1~40-100 with data, AM-modulates it and outputs a RZ optical pulse. Phase modulators 44-1~44-100 modulate phases of output lights from the data modulators 42-1~42-100 respectively.

Wavelength multiplexers 46a, 46b, 46c, and 46d respectively comprise an arrayed waveguide grating (AWG). The wavelength multiplexer 46a wavelength-multiplexes output lights from the phase modulators 44-1~44-49 corresponding to odd-numbered wavelengths (odd-numbered channels) in wavelengths $\lambda_1$~$\lambda_{49}$. The wavelength multiplexer 46b wavelength-multiplexes output lights from the phase modulators 44-2~44-50 corresponding to even-numbered wavelengths (even-numbered channels) in wavelengths $\lambda_2$~$\lambda_{50}$. The wavelength multiplexers 46c wavelength-multiplexes output lights from the phase modulators 44-51~44-99 corresponding to odd-numbered wavelengths (odd-numbered channels) in wavelengths $\lambda_{51}$~$\lambda_{99}$. The wavelength multiplexer 46d wavelength-multiplexes output lights from the phase modulators 44-52~44-100 corresponding to even-numbered wavelengths (even-numbered channels) in wavelengths $\lambda_{52}$~$\lambda_{100}$.

Output lights from the wavelength multiplexers 46a and 46b enter a polarization beam splitter 48a in mutually orthogonal polarization states, and then the polarization beam splitter 46a combines the output lights from the wavelength multiplexers 46a and 46b maintaining their polarization states. Similarly, output lights of the wavelength multiplexers 46c and 46d enter a polarization beam splitter 48b in mutually orthogonal polarization states, and then the polarization beam splitter 48b combines the output lights from the wavelength multiplexers 46c and 46d maintaining their polarization states. Needless to say, the part from the laser diodes 40-1~40-100 to the polarization beam splitters 48a and 48b comprises a polarization maintaining optical system.

Optical amplifiers 50a and 50b optically amplify output lights from the polarization beam splitters 48a and 48b respectively. A dispersion compensation fiber 52 gives output light of the optical amplifier 50b a predetermined chromatic dispersion value in advance. A fiber grating 54a removes wavelength components except for the wavelengths $\lambda_1$~$\lambda_{50}$ from the output light of the optical amplifier 50, and a fiber grating 54b removes wavelength components except for the wavelengths $\lambda_{51}$~$\lambda_{100}$ from the output light of the dispersion compensation fiber 52. An optical coupler 56 combines output lights from the fiber gratings 54a and 54b. A dispersion compensation fiber 58 provides a predetermined chromatic dispersion value to output light of the optical coupler 56 and outputs it onto an optical fiber transmission line 12. In stead of the dispersion compensation fiber 58, it is also applicable to dispose a dispersion compensation fiber for providing a desired chromatic dispersion to signal lights of signal wavelengths $\lambda_1$~$\lambda_{50}$ between the optical amplifier 50a and the fiber grating 54a.

In the configuration shown in FIG. 6, polarization orthogonality between the signal light of the wavelength $\lambda_{50}$ and that of the wavelength $\lambda_{51}$ is not guaranteed. Accordingly, it is preferable that the interval between the wavelength $\lambda_{50}$ and the wavelength $\lambda_{51}$ is set wider than a standard value; for instance, when a standard wavelength interval is 0.3 nm, it should be set approximately twice as much as 0.6 nm.

Figure 7:
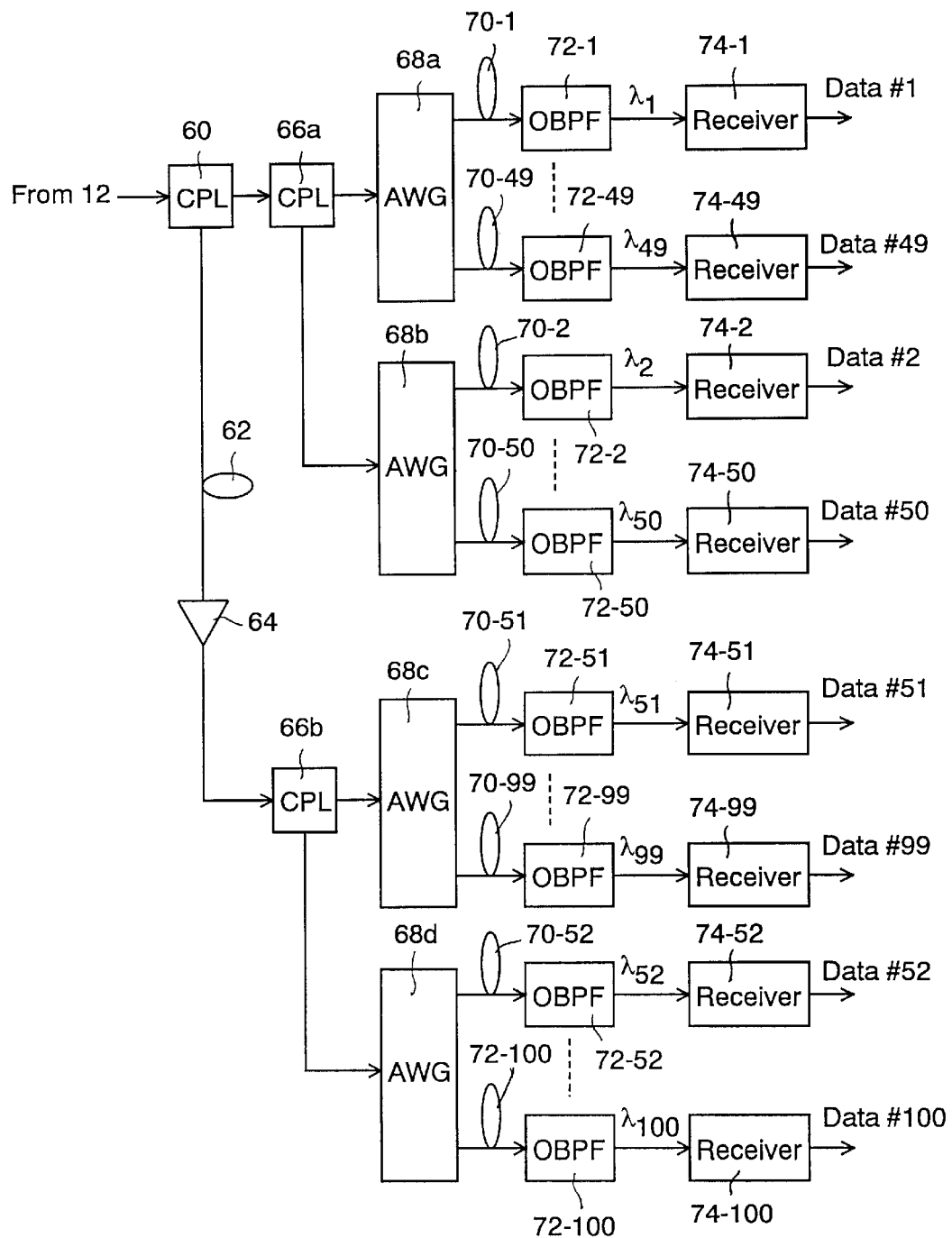
FIG. 7 shows a schematic block diagram of an optical receiver 14.

FIG. 7 shows a schematic block diagram of an optical receiver 14 corresponding to the optical transmitter 10 shown in FIG. 6. An optical coupler 60 divides input light from an optical fiber transmission line 12 into two portions. One output light of the optical coupler 60 enters an optical coupler 66a, and the other is compensated its accumulated chromatic dispersion at a dispersion compensation fiber 62, optically amplified at an optical amplifier 64, and enters an optical coupler 66b. The dispersion compensation fiber 62 is disposed for batch-compensating accumulated chromatic dispersion of signal light of wavelengths $\lambda_{51}$~$\lambda_{100}$ in advance, and the optical amplifier 64 is disposed for compensating loss caused by the dispersion compensation fiber 62.

The optical coupler 66a divides output light from the optical coupler 60 into two portions, and applies one portion to an arrayed waveguide grating 68a which functions as a wavelength demultiplexer and the other to an arrayed waveguide grating 68b which also functions as a wavelength demultiplexer. The arrayed waveguide grating 68a demultiplexes the signal lights having odd-numbered wavelengths $\lambda_1$~$\lambda_{49}$ from the input light, and the arrayed waveguide grating 68b demultiplexes signal light having even-numbered wavelengths $\lambda_2$~$\lambda_{50}$ from the input light. Similarly, the optical coupler 66b divides output light from the optical amplifier 64 into two portions, and applies one portion to an arrayed waveguide grating 68c which functions as a wavelength demultiplexer and the other to an arrayed waveguide grating 68d which also functions as a wavelength demultiplexer. The arrayed waveguide grating 68c demultiplexes signal lights having odd-numbered wavelengths $\lambda_{51}$~$\lambda_{99}$ from the input light, and the arrayed waveguide grating 68d demultiplexes signal lights having even-numbered wavelengths $\lambda_{52}$~$\lambda_{100}$ from the input light.

Each signal light having the wavelengths $\lambda_1$~$\lambda_{100}$, which are wavelength-demultiplexed as explained above, enters optical receivers 74-1~74-100 after transmitting dispersion compensation fibers 70-1~70-100 that have chromatic dispersion compensation amount adjusted per wavelength, and optical bandpass filters 72-1~72-100. The optical bandpass filters 72-1~72-100 are disposed for the purpose of removing the unnecessary wavelength components that the arrayed waveguide gratings 68a and 68b cannot remove. The optical receivers 74-1~74-100 convert the input lights into electric signals and demodulate the data.

Currently, although such element, i.e. such arrayed waveguide grating (AWG), for wavelength-division-multiplexing 50 wavelengths in a batch is not possible to obtain, the one for wavelength-multiplexing 25 wavelengths can be obtained. Accordingly, in FIGS. 6 and 7, i.e. in this embodiment, the 100 wavelengths $\lambda_1$~$\lambda_{100}$ are divided into 4 groups; namely the odd-numbered wavelengths $\lambda_1$~$\lambda_{49}$, the even-numbered wavelengths $\lambda_2$~$\lambda_{50}$, the odd-numbered wavelengths $\lambda_{51}$~$\lambda_{99}$, and the even-numbered wavelengths $\lambda_{52}$~$\lambda_{100}$, and in each group the signal lights are multiplexed and demultiplexed. As explained above, this method is employed for the sake of convenience because any wavelength multiplexer with necessary characteristics is not available. So, it is obvious when the 50 wavelengths can be wavelength-multiplexed in a batch, such multi-stage wavelength-multiplexing procedures become totally unnecessary.

Figure 8:
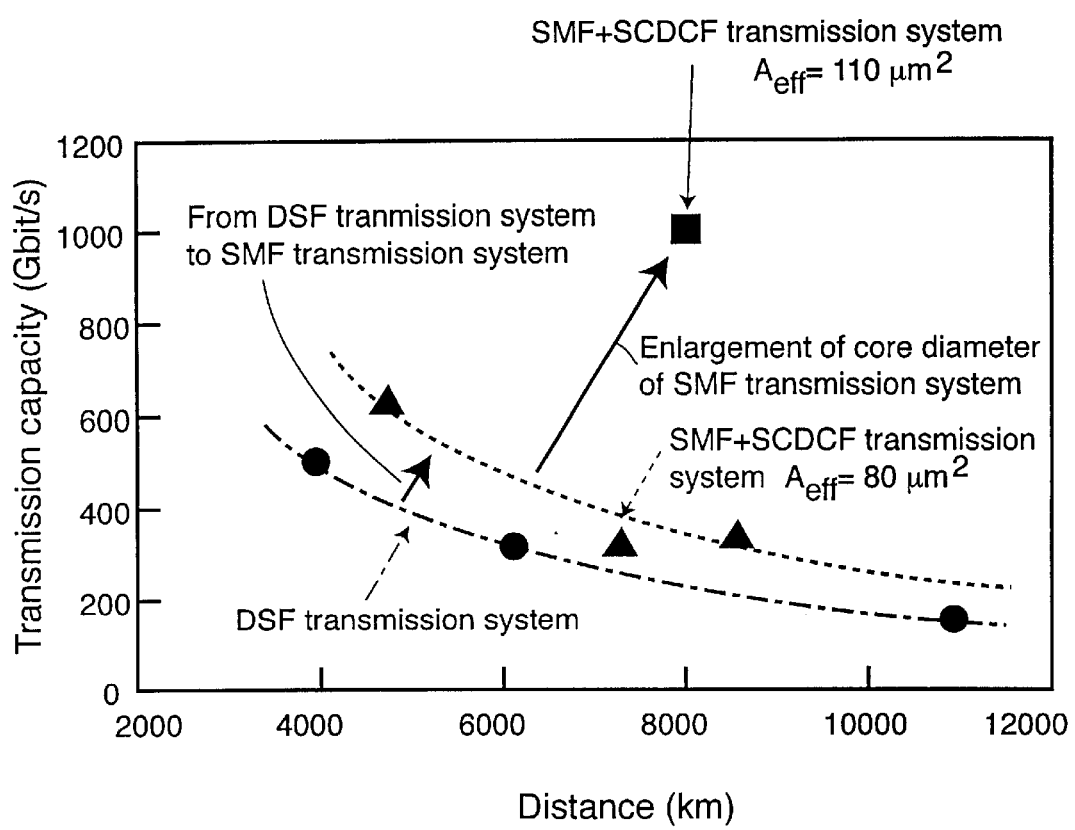
FIG. 8 shows a comparative diagram of transmission capacity and transmission distance.

FIG. 8 illustrates the existing transmission data to show the advantage obtained when an effective core area is enlarged. The vertical axis and the horizontal axis express total transmission capacity and transmission distance respectively. Solid circles express experimental values of an optical transmission system employing a dispersion shift fiber in which the wavelength (the zero dispersion wavelength) to make chromatic dispersion zero is shifted to a 1.55 μm band, and solid triangles express experimental values when a single mode optical fiber with the zero dispersion wavelength is at a 1.3 μm band and an effective core area of 85 μm² and a dispersion compensation fiber are combined. Solid squares express experimental values of this embodiment in which a single mode optical fiber with the zero dispersion wavelength is at 1.3 μm band and an effective core area of 110 μm² and a slope compensating dispersion compensation fiber is combined and dispersion map is controlled as shown in FIG. 2(b). In this embodiment, the transmission capacity and the transmission distance are both remarkably improved.

Figure 9:
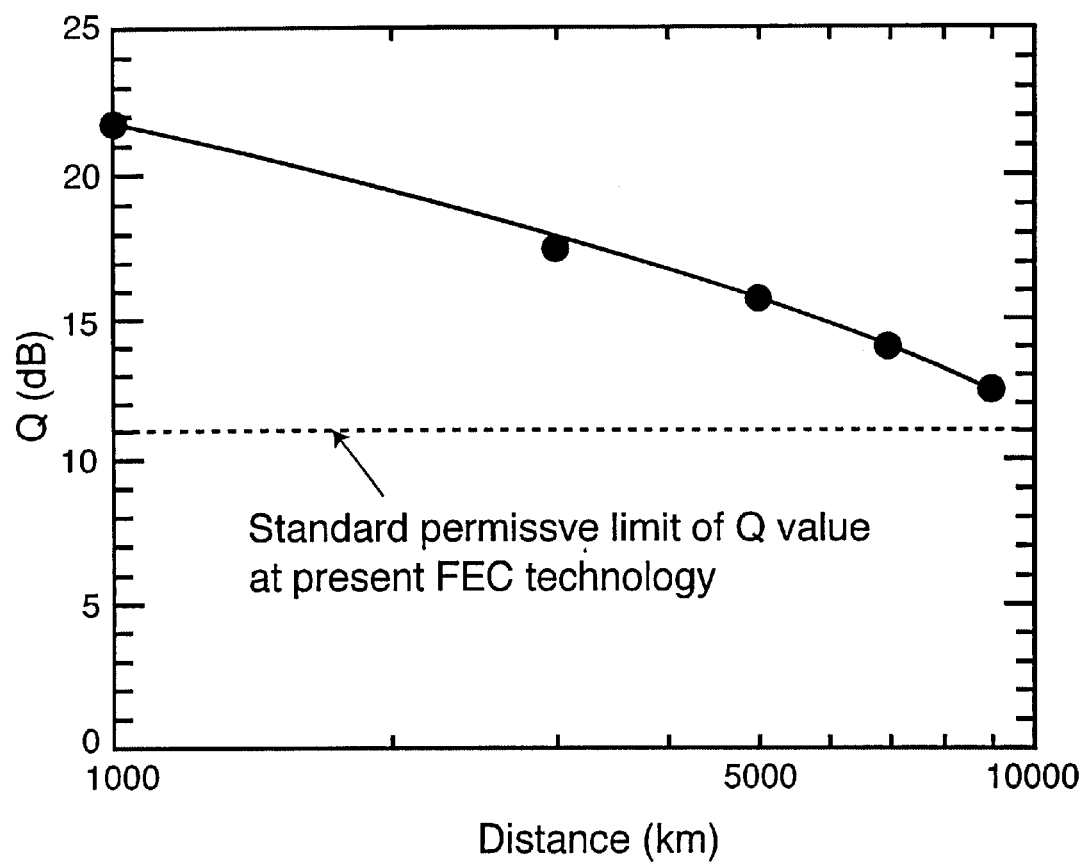
FIG. 9 shows a measured result of Q value at 1 Tbit/s.

In this embodiment, distance dependency of transmission characteristics is tested when 100 wavelengths of 10.66 Gbit/s are multiplexed. Its result is shown in FIG. 9. The horizontal axis and the vertical axis express distance and Q value respectively. The effective core area of the transmission fiber 20 is set to 110 μm². If recent FEC (forward error correction) technique is used, BER (bit error rate) becomes $10^{-11}$ when Q is 11 dB. Accordingly, when the recent FEC technique is employed and EOL (end of life) margin is set to 2 dB, it is obvious from FIG. 9 that 8000-km transmission at 1 Tbit/s can be fully realized.

In the embodiment, when the average chromatic dispersion $D_{local}$ per repeater span is set to no less than 1 ps/nm/km and no more than 4 ps/nm/km, such optical transmission line can be realized in which the nonlinear effect is little and chromatic dispersion characteristics are flat as well as signal wavelength intervals can be narrowed. Consequently, dense wavelength multiplexing can be realized and thus long haul and large capacity transmission can be realized combined with an appropriate control of the chromatic dispersion.

By disposing a wide area dispersion compensation fiber so that the average chromatic dispersion $D_{avg}$ of the whole system becomes to be minus, the frequency that the accumulated chromatic dispersion passes across the zero point reduces and hereby the accumulated chromatic dispersion of the whole optical transmission line can be controlled to keep a small value.

By disposing an attenuator for attenuating the output light of the optical repeater amplifier to become a predetermined level in the repeater span in which the wide area dispersion compensation fiber is disposed, optical amplification repeaters with the same gain characteristics can be employed and accordingly gain profile control and maintenance control become easier.

Preferably, $D_{avg}$ should be set practically from −0.3 to −0.1 ps/nm/km. With this value, the frequency that the accumulated chromatic dispersion becomes zero is reduced and thus the spectrum spreading is also reduced. Consequently, large capacity and long haul transmission such as 8000-km transmission of 1 Tbit/s can be realized.

The effective core area of the optical transmission fiber is preferably set to no less than 110 m². With this value, the nonlinear effect can be remarkably reduced. By disposing a mode field conversion optical system between the optical transmission fiber and the local area dispersion compensator, they can be optically connected at low loss in spite of their greatly different mode field diameters.

In the optical transmitter, the polarization directions of the adjacent wavelength channels are set to be opposite so that the channel-to-channel interaction such as cross phase modulation (XPM) can be reduced even when the signal wavelength intervals are narrowed.

By separately multiplexing the even-numbered wavelength channels and the odd-numbered wavelength channels and then combining with the mutually orthogonal polarizations, the adjacent wavelength channels can be combined in the different polarization directions using a fewer polarization combining elements.

By dividing the signal lights of the different wavelengths into groups according to each wavelength and removing unnecessary wavelength bands from each group, S/N ratio of the signal light to be output onto the optical transmission line can be improved and consequently the transmission distance can be extended longer.

The local area dispersion compensation fiber 24 keeps the average chromatic dispersion $D_{local}$ in the repeater span to be no less than 1 ps/nm/km and no more than 4 ps/nm/km, and the wide area dispersion compensation fiber 26 keeps the average chromatic dispersion $D_{avg}$ of the whole system to be no less than −0.3 ps/nm/km and no more than −0.1 ps/nm/km. By setting this way, the nonlinear effect and the chromatic dispersion can be highly balanced and thus the long haul transmission characteristics can be improved. Since the number of times that the accumulated chromatic dispersion passes the zero point decreases, deterioration of signal spectrum can be reduced also contributing to the improvement of the transmission characteristics.

By compensating the dispersion slope simultaneously, the optical transmission line with little nonlinear effect and flat dispersion slope can be obtained, and also the signal wavelength intervals can be narrowed. As a result, the dense wavelength multiplexing can be realized and thus the long haul and large capacity transmission can be obtained in combination with an appropriate control of the chromatic dispersion.

As readily understandable from the foregoing, according to the invention, the transmission characteristics can be improved and the long haul and/or large capacity optical transmission system can be realized. Furthermore, a large number of wavelengths can be multiplexed at high density and thus the long haul and large capacity WDM optical transmission systems and WDM optical transmission lines can be realized.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical transmission system comprising:
    an optical transmitter for outputting WDM signal light;
    an optical transmission line having a plurality of optical amplification repeater spans to transmit the WDM signal light output from the optical transmitter; and
    an optical receiver for receiving the WDM signal light propagated on the optical transmission line,
    wherein the optical amplification repeater spans of the optical transmission line each comprises, a first optical repeater amplifier for optically amplifying the WDM signal light, an optical transmission fiber of plus chromatic dispersion for transmitting the WDM signal light output from the optical repeater amplifier, and a local area dispersion compensator of minus chromatic dispersion for compensating a dispersion slope as well as compensating accumulated chromatic dispersion caused by the optical transmission fiber so that average chromatic dispersion in the respective span becomes a predetermined value $D_{local}$, wherein $D_{local}$ is no less than 1 ps/nm/km and no more than 4 ps/nm/km.

2. The optical transmission system of claim 1 wherein the optical transmission line further comprises at least one second optical amplification repeater span, one disposed at every wide area dispersion compensation cycle, the wide area dispersion compensation cycles each having a plurality of the optical amplification repeater spans, the second optical amplification repeater spans each further comprising;

a second optical repeater amplifier for optically amplifying the WDM signal light and having gain smaller than that of its respective optical repeater amplifiers; and a wide area dispersion compensator for compensating the dispersion slope to approximately zero as well as compensating the accumulated chromatic dispersion of the WDM signal light so that the average chromatic dispersion in its respective wide area dispersion compensation cycle becomes a predetermined value $D_{avg}$.

3. The optical transmission system of claim 2 wherein the second optical repeater amplifiers each comprises an optical amplifier having the same gain with that of its respective optical repeater amplifiers and an attenuator for attenuating output light from the optical amplifier to become a predetermined level.

4. The optical transmission system of claim 2 wherein $D_{avg}$ is no less than −0.3 ps/nm/km and no more than −0.1 ps/nm/km.

5. The optical transmission system of claim 1 wherein an effective core area of each of the optical transmission fibers is no less than 110 $\mu m^2$.

6. The optical transmission system of claim 5 wherein at least one of the optical amplification repeater spans further comprises a mode field conversion optical system disposed between the optical transmission fiber and the local area dispersion compensator.

7. The optical transmission system of claim 1 wherein the optical transmitter comprises a plurality of signal light generators for outputting signal lights respectively having a wavelength different from each other and a polarization combiner for combining the signal lights output from the signal light generators so that polarizations of adjacent wavelength channels become orthogonal.

8. The optical transmission system of claim 1 wherein the optical transmitter comprises a plurality of signal light generators for outputting signal lights respectively having a wavelength different from each other, a first wavelength multiplexing element for wavelength-multiplexing the signal lights with even-numbered wavelengths output from the signal light generators in a first polarization, a second wavelength multiplexing element for wavelength-multiplexing the signal lights with odd-numbered wavelengths output from the signal light generators in a second polarization, and a polarization combiner for combining output lights from the first and second wavelength multiplexing elements in mutually orthogonal polarizations from each other.

9. The optical transmission system of claim 1 wherein the optical transmitter comprises:

a plurality of signal light generators for outputting signal lights respectively having a wavelength different from each other, the plurality of signal light generators being divided into a plurality of groups based on wavelength;

a plurality of wavelength multiplexers for wavelength-multiplexing the signal lights output from the respective groups of the signal light generators;

a plurality of optical filters for removing out of band components from the respective output lights of the plurality of the wavelength multiplexers;

a combiner for combining output lights from the plurality of the optical filters; and a plurality of chromatic dispersion imparters for imparting predetermined amounts of chromatic dispersion to the signal lights of the respective groups.

10. The optical transmission system of claim 1 wherein the optical transmitter comprises:

a plurality of signal light generators for outputting signal lights respectively having a wavelength different from each other, the signal light generators being divided into first and second groups;

a first wavelength multiplexing element for wavelength-multiplexing the signal lights with even-numbered wavelengths output from the first group of the signal light generators in a first polarization;

a second wavelength multiplexing element for wavelength-multiplexing the signal light with odd-numbered wavelengths output from the first group of the signal light generators in a second polarization;

a first polarization combiner for combining output lights from the first and second wavelength multiplexing elements in mutually orthogonal polarizations;

a first optical filter for removing out of band components from output light of the first polarization combiner;

a third wavelength multiplexing element for wavelength-multiplexing the signal lights with the even-numbered wavelengths output from the second group of the signal light generators in a third polarization;

a fourth wavelength multiplexing element for wavelength-multiplexing the signal lights with the odd-numbered wavelengths output from the second group of the signal light generators in a fourth polarization;

a second polarization combiner for combining output lights from the third and fourth wavelength multiplexing elements in mutually orthogonal polarizations;

a second optical filter for removing out of band components from output light of the second polarization combiner;

a combiner for combining output lights from the first and second optical filters; and first and second chromatic dispersion imparters for imparting predetermined amounts of chromatic dispersion to the signal lights in the first and second groups respectively.

11. The optical transmission system of claim 10 wherein the first chromatic dispersion imparter is connected to an output of the combiner, and the second chromatic dispersion imparter is disposed between the second polarization combiner and the combiner.

12. An optical transmission line comprising a plurality of optical amplification repeater spans to transmit WDM signal light, wherein each optical amplification repeater span comprises:

an optical repeater amplifier for optically amplifying the WDM signal light;

an optical transmission fiber of plus chromatic dispersion for transmitting the WDM signal light output from the optical repeater amplifier; and a local area dispersion compensator of minus chromatic dispersion for compensating accumulated chromatic dispersion caused by the optical transmission fiber so that average chromatic dispersion in the respective span becomes a predetermined value $D_{local}$ as well as compensating a dispersion slope, wherein $D_{local}$ is no less than 1 ps/nm/km and no more than 4 ps/nm/km.

13. The optical transmission line of claim 12 further comprising:
   a second optical repeater amplifier for optically amplifying the WDM signal lights output after propagating through the plurality of the optical amplification repeater spans, the second optical repeater amplifier having gain smaller than that of the first optical repeater amplifies; and
   a wide area dispersion compensator for compensating the accumulated chromatic dispersion of the WDM signal lights output from the second optical repeater amplifier so that the average chromatic dispersion becomes a minus predetermined value $D_{avg}$ as well as compensating the dispersion slope to approximately zero.

14. The optical transmission line of claim 13 wherein the second optical repeater amplifier comprises an optical amplifier having the same gain with that of the optical repeater amplifiers, and an attenuator for attenuating output light of the optical amplifier to a predetermined level.

15. The optical transmission line of claim 13 wherein $D_{avg}$ is no less than −0.3 ps/nm/km and no more than −0.1 ps/nm/km.

16. The optical transmission line of claim 12 wherein an effective core area of each of the optical transmission fibers is no less than 110 $\mu m^2$.

17. The optical transmission line of claim 16 wherein at least one of the optical amplification repeater spans further comprises a mode field conversion optical system disposed between the optical transmission fiber and the local area dispersion compensator.

18. An optical transmission system comprising:
   an optical transmitter for outputting signal light;
   an optical transmission line for transmitting the signal light output from the optical transmitter; and
   an optical receiver for receiving the signal light transmitted on the optical transmission line,
   wherein the optical transmission line comprises,
   a plurality of optical transmission fibers for transmitting the signal light,
   a plurality of optical repeater amplifiers for optically amplifying the signal light,
   one or more wide area dispersion compensators, each being disposed in a respective wide area dispersion compensation cycle, the wide area dispersion compensation cycle having a plurality of optical repeater spans each having one of the optical repeater amplifiers, and one of the optical transmission fibers for compensating chromatic dispersion of the signal light so that an average chromatic dispersion value of the transmission line becomes a value equal to a minus predetermined value $D_{avg}$, wherein $D_{avg}$ is no less than −0.3 ps/nm/km and no more than −0.1 ps/nm/km, and
   a plurality of local area dispersion compensators, one disposes after the optical transmission fiber in each of the optical repeater spans within the wide area dispersion compensation cycle, for compensating the chromatic dispersion of the signal light output from the optical transmission fiber so that the average chromatic dispersion value in each of the optical repeater spans becomes a predetermined value $D_{local}$, wherein $D_{local}$ is no less than 1 ps/nm/km and no more than 4 ps/nm/km.

19. The optical transmission system of claim 18 further comprising an attenuator with a predetermined loss amount disposed in front of the wide area dispersion compensator in each of the wide area dispersion compensation cycles for adjusting loss in its respective optical repeater span to a predetermined value.

20. The optical transmission system of claim 18 wherein the wide area dispersion compensator compensates the dispersion slope of the signal light to approximately zero.

21. The optical transmission system of claim 18 wherein the local area dispersion compensator compensates the dispersion slope of the signal light to approximately zero.

22. The optical transmission system of claim 18 wherein an effective core area of each of the optical transmission fibers is no less than 110 $\mu m^2$.

23. The optical transmission system of claim 22 further comprising mode field conversion optical systems respectively disposed between the optical transmission fibers and the local area dispersion compensators.

24. The optical transmission system of claim 18 wherein the optical transmitter outputs signal light having a plurality of wavelength-multiplexed wavelengths.

25. An optical transmission line comprising:
   a plurality of optical transmission fibers for transmitting signal light;
   a plurality of optical repeater amplifiers for optically amplifying the signal light;
   one or more wide area dispersion compensators, each being disposed in a respective wide area dispersion compensation cycle, the wide area dispersion compensation cycle having a plurality of optical repeater spans each having one of the optical repeater amplifiers, and one of the optical transmission fibers for compensating chromatic dispersion of the signal light so that an average chromatic dispersion of the transmission line becomes a value equal to a minus predetermined value $D_{avg}$, wherein $D_{avg}$ is no less than −0.3 ps/nm/km and no more than −0.1 ps/nm/km; and
   a plurality of local area dispersion compensators, one disposed after the optical transmission fiber in each of the optical repeater spans within the wide area dispersion compensation cycle, for compensating chromatic dispersion of the signal light output from the optical transmission fiber so that the average chromatic dispersion in each optical repeater span becomes a predetermined value $D_{local}$, wherein $D_{local}$ is no less than 1 ps/nm/km and no more than 4 ps/nm/km.

26. The optical transmission line of claim 25 further comprising an attenuator with a predetermined loss amount disposed in front of the wide area dispersion compensator in each of the wide area dispersion compensation cycles for adjusting loss in its respective optical repeater span to a predetermined value.

27. The optical transmission line of claim 25 wherein the wide area dispersion compensator compensates the dispersion slope of the signal light to approximately zero.

28. The optical transmission system of claim 25 wherein the local area dispersion compensator compensates the dispersion slope of the signal light to approximately zero.

29. The optical transmission system of claim 25 wherein an effective core area of each of the optical transmission fibers is no less than 110 $\mu m^2$.

30. The optical transmission system of claim 29 further comprising mode field conversion optical systems respectively disposed between the optical transmission fibers and the local area dispersion compensators.

* * * * *